No. 668,847. Patented Feb. 26, 1901.
J. BIRNBAUM.
DEVICE FOR PREVENTING LEAKS IN STEAM PIPES.
(Application filed May 2, 1900.)

(No Model.)

WITNESSES:
B. S. Sterling
Robert J. ...

INVENTOR
John Birnbaum
By his Attorney
Walter W. Colmore

UNITED STATES PATENT OFFICE.

JOHN BIRNBAUM, OF PHILADELPHIA, PENNSYLVANIA.

DEVICE FOR PREVENTING LEAKS IN STEAM-PIPES.

SPECIFICATION forming part of Letters Patent No. 668,847, dated February 26, 1901.

Application filed May 2, 1900. Serial No. 15,222. (No model.)

*To all whom it may concern:*

Be it known that I, JOHN BIRNBAUM, a citizen of the United States of America, and a resident of the city and county of Philadelphia, in the State of Pennsylvania, have invented certain new and useful Improvements in Devices for Preventing Leaks in Steam-Pipes, of which the following is a specification.

My invention relates to new and useful improvements in devices for preventing leaks in main steam-pipes, and is more particularly adapted to that class of pipes in which a union is used to couple several ends thereof, as is the case in steam and marine boilers in which the steam is carried a considerable distance away from the point of generation.

Figure 1:
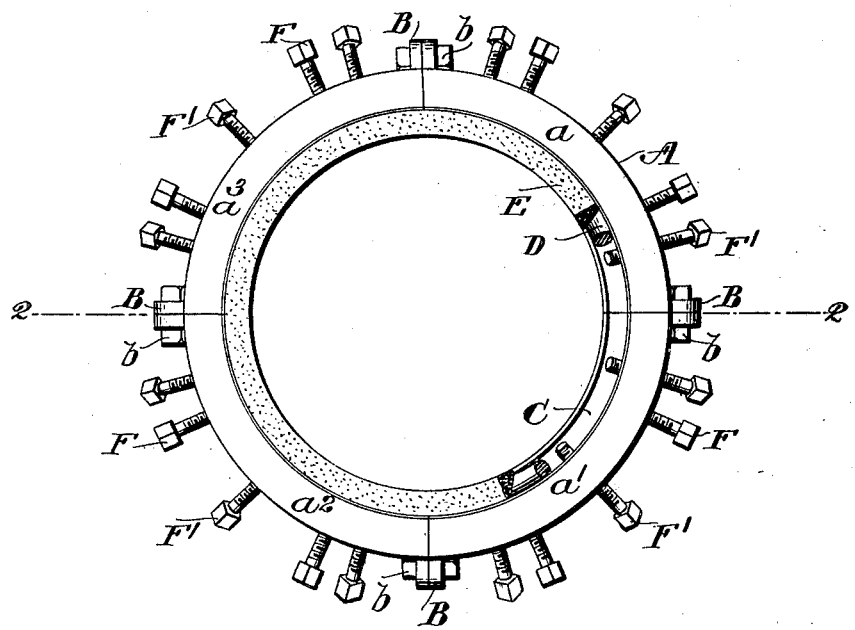
Figure 2:
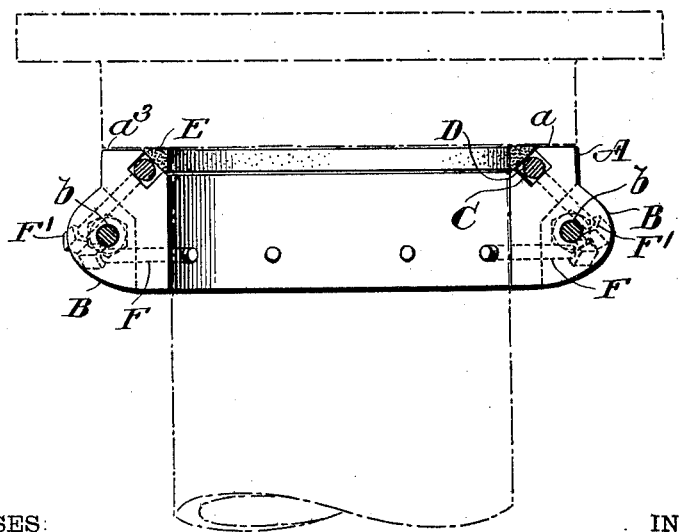

In the drawings, Figure 1 represents a plan view of my invention; and Fig. 2 represents a side elevation thereof, showing my new device in connection with a section of pipe.

Similar letters of reference designate corresponding parts throughout both views.

In detail, A designates my improved collar, which is made up of sections, preferably and as shown, of four, $a$, $a'$, $a^2$, and $a^3$, each end of the said sections being provided with projections B, adapted to receive suitable fastening devices, preferably a bolt and nut $b$, for securing the sections together when in position on the pipe. Each of these sections is provided on its inside upper edge with a channel or groove C, adapted to aline with each other when said sections are in operative position.

D designates a metal ring adapted to rest and fit snugly in the channel C. E designates a flexible gasket which is adapted to rest against the said ring D, and F and F' designate set-screws which enter and pass through holes in the sides of the metal collar A, screws F at right angles, and F' at an angle thereto, the former adapted to hold the metal collar A firmly in place upon the pipe and the latter, the ends of which protrude and enter the channel or groove C, adapted to press the metal ring against the flexible gasket and is in turn firmly pressed against the leak in the pipe.

The operation is as follows: Upon a leak in a pipe occurring at or near its union the metal collar being in sections can be separated and fitted to the pipe and the sections firmly bolted to each other by the fastenings $b$. The set-screws are then manipulated, F firmly securing the collar in place, and F' pressing the ring D against the gasket E, which in turn is forced tightly over the leak, which is thereby effectually stopped.

Having now described my invention, what I claim as new, and desire to secure by Letters Patent, is—

1. A leak-stopping device for pipes, consisting of a metal collar made of sections adapted to be assembled, each section being provided at its upper inner edge with a groove or channel; a metal ring of a size and adapted to snugly fit said channel when the sections are assembled; a flexible gasket adapted to rest upon the metal ring; means for holding the collar in place upon the pipe, and means that enter the said channel and operate upon the metal ring, which in turn forces the flexible gasket against the leak in the pipe.

2. In devices for preventing leaks in pipes, a collar in sections of suitable material, each section being provided with an inclined channel; a flexible ring adapted to rest in said inclined channel, means as bolts arranged at an incline for holding said collar in place upon a pipe, and means for forcing the gasket over a leak.

3. In devices for preventing leaks in pipes, a collar in sections of suitable material, each section provided with an inclined channel; a metal ring adapted to rest in and snugly fit said channel when the sections are assembled; a flexible ring adapted to rest upon the metal ring, a series of bolts for holding the collar in place upon a pipe, and means as bolts arranged at an incline for forcing the metal ring against the flexible one, and it, in turn, against the leak in the pipe.

Signed at Philadelphia, Pennsylvania, this 28th day of April, 1900.

JOHN BIRNBAUM.

Witnesses:
ARTHUR WATERS,
C. P. ALLEN, Jr.